Nov. 15, 1966   R. L. LANDIS   3,284,957
SEALING GASKETS
Filed June 22, 1964
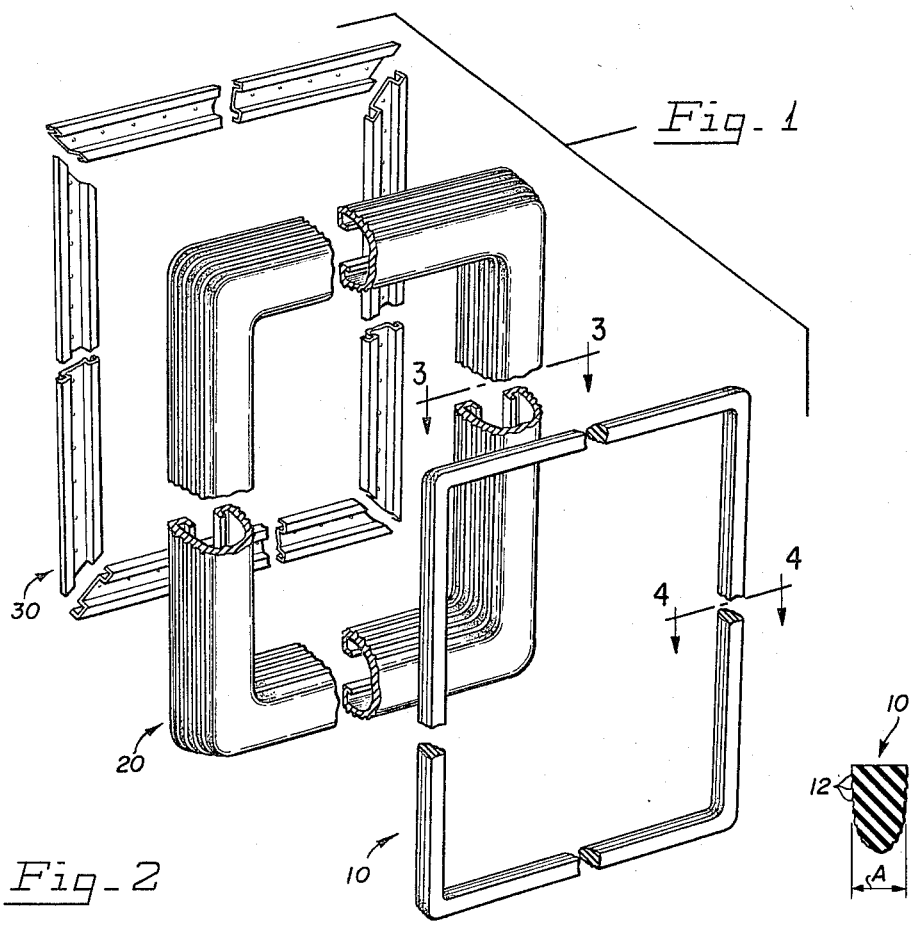
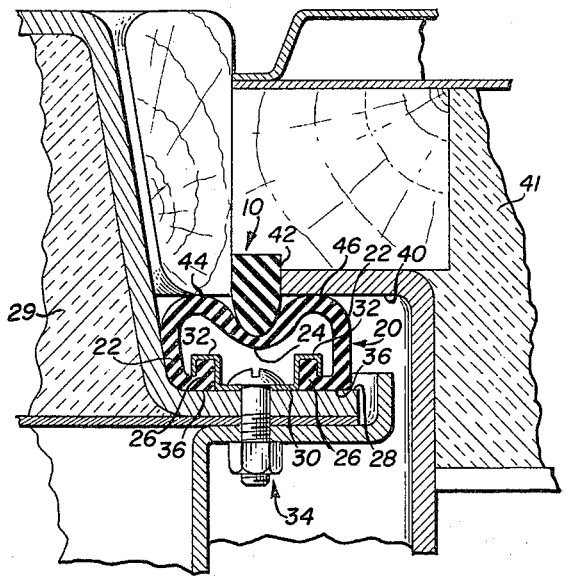
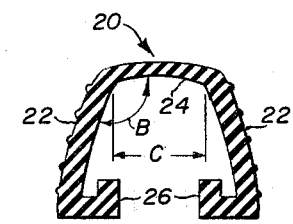
INVENTOR.
ROBERT L. LANDIS
BY
ATTORNEY

3,284,957
SEALING GASKETS
Robert L. Landis, 25538 Adobe Lane, Los Altos, Calif.
Filed June 22, 1964, Ser. No. 376,922
4 Claims. (Cl. 49—495)

This invention relates to a sealing means. More specifically this invention pertains to a sealing means comprising a deformable gasket and a deforming seal member.

In many heavy duty sealing situations the mating of a sealing gasket with the surface to be sealed does not provide an adequate seal. This sealing deficiency may arise from the irregularity of the surface that is to be sealed or the extreme environment to which the seal is exposed. A refrigerator freight car door is a typical use that may impose severe sealing requirements.

Many of the prior art seals have had the additional shortcoming of requiring as much as forty pounds of force per lineal foot of seal to obtain an effective seal. For seals of great length the required sealing forces would be very large. These forces alone, or coupled with the forces necessary to move the heavy surfaces that are to be sealed, such as freight car doors, require unwieldy and expensive mechanical structures.

Broadly, the instant invention solves the above sealing problems by providing a readily deformable sealing or gasket member on one surface of the door and door jamb combination or surface that is to be sealed and a bead or deforming seal member on the other surface of the door. The bead engages the gasket member to provide a first seal and also deforms the gasket so that it intimately engages at least one surface or portion of the door. The readily deformable gasket and bead combination enables very low sealing forces to be used. These features and advantages along with the specific features of the invention and other advantages will be readily understood when the detailed written description is taken in conjunction with the drawings wherein:

FIG. 1 is an exploded assembly drawing of the retainer, deformable gasket member and deforming seal member that form the sealing means.

FIG. 2 is an enlarged sectional view of the sealing means as attached to surfaces that are to be sealed.

FIG. 3 is an enlarged sectional view taken along the lines 3—3 of FIG. 1.

FIG. 4 is an enlarged sectional view taken along the lines 4—4 of FIG. 1.

Referring to FIG. 1, the sealing means comprises a bead or deforming seal member 10, a readily deformable gasket or deformable seal member 20 and a retainer 30. All of the members 10, 20 and 30 have a rectangular perimeter that may readily be placed around the surfaces to be sealed such as a door and a framing surface (or door jamb) for a door. Other uses of the sealing means are well within the scope of the invention.

The bead 10, as shown in detail in FIGS. 2 and 4, is semi-elliptical in shape with a plurality of sealing lips or ridges 12 along its surface. The sealing lips 12 form a circuitous sealing path with a multiplicity of sealing surfaces when the bead 10 abuts the gasket 20. The bead 10 in the preferred embodiment is made of rubber and is a part separate from the surfaces to be sealed. It is within the broad scope of the invention to make the bead integral with the surfaces that are sealed and from materials such as wood, plastic, and other suitable materials. Dimensionally the bead is narrower than the gasket 20. The bead width A (FIG. 4) typically is ⅝ inch.

The gasket 20, specifically shown in FIGS. 2 and 3, has a pair of sides or side walls 22 that are joined by a broad flexible rib 24 continuous with the sides. In the preferred configuration the rib 24 makes an angle B with the side walls 22. The angle B is generally greater than ninety degrees. The dimension C, which is referred to as the side wall separation, is greater than the bead dimension A. Typically the dimension C may be approximately 1⅛ inches. It seems that the side wall separation C should be at least 1.1 times wider than the bead dimension A but this need not be rigidly adhered to. The side walls 22 are preferably slightly thicker than the rib 24. Typically the side walls may be 3/16 inch, while the rib is ⅛ inch.

It is important that the gasket 20 be easily deformed as this is a decisive factor in determining the force required to obtain the desired seal. The relative length of dimensions A and C, the angle B and the material used are important variables in controlling the deformability of flexibility of the gasket 20. There are other factors which contribute to the optimum design.

Another important feature of the gasket 20 is the internal corners or flanges 26 which are continuous about the internal perimeter of the gasket 20. As shown in FIG. 2, the gasket 20 is secured in position to one of the surfaces 28 by the retainer or securing means 30 which cooperates with the flanges 26. The retainer 30 takes the form of a galvanized metal strip that may be divided into four parts to form a rectangular frame. A pair of rectangular cross-section shoes or gripping fingers 32 on the retainer 30 snugly fit over the flanges 26 to secure the gasket 20 to the surface 28.

When installing the gasket 20, the retainer 30 is loosely secured to the surface 28 by a fastening means or a plurality of nuts and bolts 34. The gasket flanges 26 are placed or snapped into the shoes 32 and the fastening means 34 are tightened to secure the gasket surfaces 36 to the surface 28.

The bead 10 is shown fastened in position in FIG. 2. Once in position on the surface to be sealed or door framing surface 40, the door or other surface 28 which carries the gasket 20 is placed in position. The door 29 typically may be nine to ten feet square weighing fifteen to eighteen hundred pounds. The bead 10 may be press fit, nailed or otherwise secured in a groove 42 in the door jamb 41. The inside perimeter of the bead 10 is made one to two inches shorter than the inside perimeter of the groove 42. This provides a close fit of the bead 10 in the groove 40 and compensates for stretching during assembly.

With the door 41 in position, the bead 10 sealingly engages the rib 24 approximately midway between the sides 22. The bead 10 with its plurality of lips 12 forms a seal at the area of engagement with the rib 24 and collapses the gasket 20 into a U-shape. In addition, the deformed rib 24 engages the other surface or the door jamb 40 at 44 and 46 to form two more sealing areas and a total of three.

In operation, the primary seal is established between the crown of the bead 10 and the center of rib 24 upon the former deformably engaging the latter. The seals established at either side of the primary seal between the gasket 20 and the door framing 40 are secondary seals and assist in effectively sealing across the opposite surfaces.

Instead of affixing the rib to the door jamb and the seal to the door, the reverse can be done. In fact, there are certain advantages to placing the gasket upon the door jamb since in that position the gasket can be more fully protected against damage as the freight car is loaded by laying the gasket in a channel in the jamb having internal side walls on either side of the gasket.

Also, instead of making the bead a separate part and mounting the same upon the door or jamb, the same may be formed integral with the edge of the door or jamb in the form of a ridge with surfaces on either side of the ridge for forming the secondary seals. If the ridge is integrally formed to provide the deforming bead the same may also form the edge of the door or jamb in which case one surface providing a secondary seal is sacrificed; however a primary seal together with a single secondary seal has been found to be entirely satisfactory for most applications.

As described above, it can be seen that the hollow, flexible readily deformable gasket 20 acting in combination with the deforming seal member or bead 10 provides a plurality of seal areas along a circuitous path. This type of sealing path is particularly effective in preventing contaminants from penetrating the sealing barrier. The combination accomplishes the effective seal with a startling reduction of the required sealing force. The necessary sealing force in one case has been reduced by a factor of four. These significant advantages are accomplished in conjunction with a simple retainer that facilitates installation. All in all the sealing means provides a reliable and improved arrangement with a minimum of complexity.

It is to be understood that variations and modifications of the specific device herein shown and described for purposes of illustration, may be made without departing from the spirit of the invention.

What is claimed is:

1. A sealing means for sealing the space between a pair of laterally movable, parallel surfaces comprising:
   a deformable gasket member having two substantially flat sides joined by a flexible rib member whose thickness is less than the thickness of said sides, said sides making an angle of greater than 90 degrees with said rib member and being mounted to one of the surfaces that is to be sealed; and
   a deforming seal member having a width narrower than the distance between said sides and a rounded end portion, said deforming seal member being mounted on the other surface to be sealed so that its rounded end portion sealingly engages said rib member and collapses said gasket member when the surfaces to be sealed are moved towards one another, said gasket member and said seal member being dimensioned and disposed so that, upon sealing engagement, said gasket member is deformed into sealing engagement with the other surface having said seal member mounted thereon.

2. A sealing means in accordance with claim 1 in which the outer surface of said sides includes at least one sealing ridge, said sealing ridge being disposed for sealing with the surface having said seal member mounted thereon.

3. A sealing means for sealing the space between a pair of laterally movable, parallel surfaces comprising:
   a deformable gasket member having two substantially flat sides joined by a flexible rib member, said sides being secured to one of the surfaces that is to be sealed; and
   a deforming seal member having a width narrower than the distance between said sides and a rounded end portion, said deforming seal member being mounted on the other surface to be sealed and being disposed so that its rounded end portion engages said rib member in the center thereof and collapses said gasket member in the center thereof when the surfaces to be sealed are moved toward one another, to form a primary seal between said deforming seal member and said rib portion of said gasket member, the collapse of said gasket member by engagement with said end portion of said deforming seal member also causing a portion of said gasket member to sealingly engage the other surface having said seal member mounted thereon to form at least one secondary seal therewith.

4. A sealing means in accordance with claim 3 in which the collapse of said gasket member in the center thereof by said deforming seal member causes two portions of said gasket member on either side of the area of engagement with said seal member to sealingly engage the other surface to form secondary seals therewith.

References Cited by the Examiner

UNITED STATES PATENTS

| 69,420 | 10/1867 | Estep et al. | 27—17 |
|---|---|---|---|
| 1,901,780 | 3/1933 | Sleeper | 20—69 X |
| 2,130,017 | 9/1938 | Lewis | 20—69 |
| 2,230,985 | 2/1941 | Gail | 20—69 |
| 2,263,831 | 11/1941 | Welch | 20—35 X |
| 2,502,607 | 4/1950 | Vinton. | |
| 2,717,514 | 9/1955 | Meek | 20—69 X |
| 3,037,251 | 6/1962 | Landis | 29—69 |
| 3,117,352 | 1/1964 | Reahard et al. | 20—69 |
| 3,159,885 | 12/1964 | Cowles | 20—69 |

FOREIGN PATENTS 545,798 7/1956 Italy.

HARRISON R. MOSELEY, *Primary Examiner.*

W. E. HEATON, *Assistant Examiner.*